United States Patent [19]
Koppers

[11] 3,981,057
[45] Sept. 21, 1976

[54] CUTTING TOOL

[75] Inventor: Kurt Koppers, Gummersbach, Germany

[73] Assignee: Fried. Krupp Gesellschaft mit beschrankter Haftung, Essen, Germany

[22] Filed: Nov. 14, 1975

[21] Appl. No.: 632,173

[30] Foreign Application Priority Data
Nov. 23, 1974 Germany............................ 2455612

[52] U.S. Cl..................................... 29/96; 29/95 R
[51] Int. Cl.² ..................... B26D 1/12; B26D 1/00
[58] Field of Search .................................. 29/95, 96

[56] References Cited
UNITED STATES PATENTS

| | | | |
|---|---|---|---|
| 1,585,000 | 5/1926 | Thompson | 29/96 |
| 2,870,523 | 1/1959 | Richard | 29/96 |
| 3,121,939 | 2/1964 | Williams | 29/96 |
| 3,172,190 | 3/1965 | Beach | 29/96 |
| 3,178,801 | 4/1965 | Krueger | 29/96 |
| 3,188,717 | 6/1965 | Heinlein | 29/96 |

*Primary Examiner*—Harrison L. Hinson
*Attorney, Agent, or Firm*—Spencer & Kaye

[57] ABSTRACT

A cutting tool comprises a tool bit having the configuration of a hollow pyramid which includes an open base and three side walls, each having an outer face. The adjoining outer faces define three cutting edges coverging in the apex of the pyramid. The cutting tool further has a base block with a recess for receiving the tool bit and a clamping device for tightening the tool bit, positioned in said recess, to the base block.

7 Claims, 3 Drawing Figures

CUTTING TOOL

BACKGROUND OF THE INVENTION

This invention relates to a cutting tool which comprises a base block and at least one replaceable cutting tool bit.

Cutting tools in which the cutting tool bit is designed as a reversible cutting blade are known. The reversible cutting blade may have a circular, square, rectangular, triangular or rhombic shape. The geometric configuration of the cutting tool bit determines the number of the cutting edges and the magnitude of the cutting edge angle, while the shape of the tool bit, particularly its wedge angle and the arrangement of the tool bit on the base block determine the magnitude of the rake angle and the clearance angle. For example, a quadratic reversible cutting blade for a positive rake angle has a maximum of four cutting edges and a cutting edge angle of 90°. Reversible cutting blades of this type are disadvantageous in that due to their geometric shape they are scarcely adapted, if at all, to perform duplicating operations or copying by in-movement. This is so, because their cutting edge angle is many times too large and very often they cannot be properly arranged on the base block. Further, the machining of the cutting edges is expensive.

SUMMARY OF THE INVENTION

It is an object of the invention to provide an improved cutting tool of the above-outlined type which is better adapted for a duplicating operation, a copying operation by in-movement, as well as similar operations than cutting tools known heretofore.

This object and others to become apparent as the specification progresses, are accomplished by the invention, according to which, briefly stated, the cutting tool bit has the geometric configuration of a hollow, three-sided pyramid which has an open base and in which the three outer faces of the pyramid form three cutting edges converging in a spacial angle. Further, the cutting tool bit is disposed in a recess of the base block and is tightened to the base block by a clamping device.

According to a further feature of the invention, the cutting edge angle of the tool bit has a magnitude of 45° to 90°, preferably between 45° and 55°.

The properties of the cutting tool can be further improved according to the invention, by providing the outer faces of the tool bit with chip breaker depressions or grooves and further, by forming the base edges of the three outer faces of the tool bit as auxiliary cutting edges.

The cutting tool bit structured according to the invention is particularly advantageous in that the shape of the tool bit and the geometry of the cutting edges can be adapted to the momentary mode of application of the cutting tool in an optimal manner by changing the position of the outer faces of the pyramid and further, that the forces generated during the cutting operation are transmitted fully to the base block by virtue of the rigid connection between base block and tool bit.

DESCRIPTION OF THE PREFERRED EMBODIMENT

Figure 1:
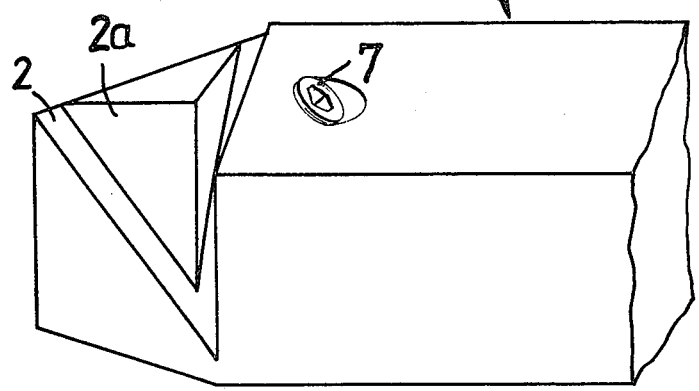
FIG. 1 is a perspective view of a base block according to the invention.

Turning first to FIG. 1, there is shown a base block 1 provided with at least one recess 2, in which there is formed a pyramidal projection 2a of the base block 1.

Figure 2:
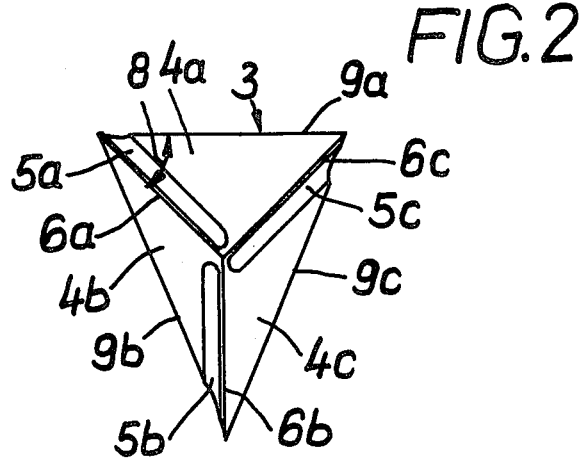
FIG. 2 is a top plan view of a tool bit according to the invention.

In FIG. 2 there is illustrated a cutting tool bit 3 which has the shape of a three-sided pyramid with a hollow inside and an open base. The tips of the pyramid may be rounded. On the three outer faces 4a, 4b and 4c of the tool bit 3 there are provided chip breaker grooves 5a, 5b and 5c, respectively. The outer faces, 4a, 4b and 4c, define three cutting edges 6a, 6b and 6c, which converge in the pyramid apex pointed towards the viewer in FIG. 2.

The pyramid faces 4a, 4b and 4c have respective base edges 9a, 9b and 9c which bound the pyramid base and which functions as auxiliary cutting edges.

Figure 3:
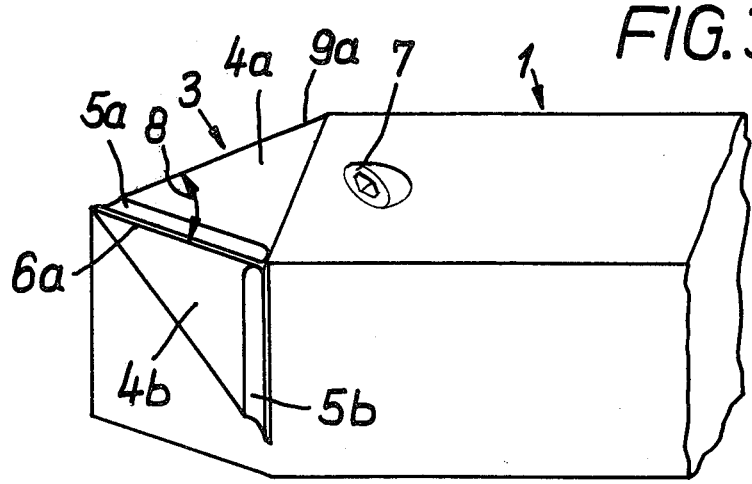
FIG. 3 is a perspective view of the base block and tool bit assembly.

FIG. 3 shows the base block 1 and the tool bit 3 in an assembled state. The pyramidal projection 2a is substantially complemental with the inner, hollow configuration of the tool bit 3 and thus the latter fits on the projection 2a. The inwardly oriented pyramid side which contains the outer face 4c is tightened against the adjoining side of the pyramidal projection 2a by a clamping device 7 to thus obtain a rigid assembly 1, 3. The outer surfaces which do not participate in the clamping of the cutting bit 3, that is, the surfaces 4a and 4b function as a cutting face and a flank face, respectively. The cutting edge angle 8 which is formed by the auxiliary cutting edge 9a and the principal cutting edge 6a may be altered by changing the shape of the pyramid.

The cutting tool designed according to the invention has a cutting edge angle 8 of a magnitude between 45° and 90°. It has been found that particularly good results can be achieved in the duplicating or inward copying operations when the cutting edge angle 8 of the cutting tool has a magnitude between 45° and 55°.

It will be understood that the above description of the present invention is susceptible to various modifications, changes and adaptations, and the same are intended to be comprehended within the meaning and range of equivalents of the appended claims.

What is claimed is:

1. A cutting tool comprising
   a. a tool bit having the configuration of a hollow pyramid including an open base and three side walls; each side wall having an outer face; the adjoining outer faces defining three cutting edges converging in the apex of the pyramid;
   b. a base block including means defining a recess for receiving said tool bit; and
   c. a clamping device for tightening said tool bit, positioned in said recess, to said base block.

2. A cutting tool as defined in claim 1, wherein said tool bit has a cutting edge angle of a magnitude from 45° to 90°.

3. A cutting tool as defined in claim 2, wherein the magnitude of said cutting edge angle is between 45° and 55°.

4. A cutting tool as defined in claim 1, wherein each said outer face includes means defining a chip breaker depression.

5. A cutting tool as defined in claim 4, wherein said depression has a groove shape.

6. A cutting tool as defined in claim 1, wherein each said outer face has a base edge bounding said open base; each base edge being formed as an auxiliary cutting edge.

7. A cutting tool as defined in claim 1, said base block having a pyramidal projection in said recess; said pyramidal projection being complemental with the inner, hollow configuration of said pyramid for insertion of said pyramid over said pyramidal projection in said recess.

* * * * *